United States Patent
Levander

(10) Patent No.: US 6,966,804 B2
(45) Date of Patent: Nov. 22, 2005

(54) PROPULSION UNIT OF MARINE VESSEL

(75) Inventor: Oskar Levander, Turku (FI)

(73) Assignee: Wartsila Finland Oy, Vaasa (FI)

( * ) Notice: Subject to any disclaimer, the term of this patent is extended or adjusted under 35 U.S.C. 154(b) by 0 days.

(21) Appl. No.: 10/819,427

(22) Filed: Apr. 6, 2004

(65) Prior Publication Data

US 2004/0198108 A1 Oct. 7, 2004

(30) Foreign Application Priority Data

Apr. 7, 2003 (FI) .................................. 20030519

(51) Int. Cl.[7] ............................ B63H 5/10; B63H 25/06
(52) U.S. Cl. ............................ 440/51; 440/80; 416/128
(58) Field of Search ............................ 440/50, 51, 79, 440/80, 82; 416/125, 128, 129

(56) References Cited

U.S. PATENT DOCUMENTS

| 3,938,464 A | 2/1976 | Gill |
| 5,795,199 A * | 8/1998 | Langenberg et al. .......... 440/79 |

FOREIGN PATENT DOCUMENTS

| DE | 3808710 A | * | 9/1989 |
| JP | 362163895 A | * | 7/1987 |
| JP | 406056082 A | * | 3/1994 |
| SE | 448981 | | 1/1985 |

OTHER PUBLICATIONS

Translation of JP 6-56082-A.*

* cited by examiner

Primary Examiner—Sherman Basinger
(74) Attorney, Agent, or Firm—John Smith-Hill; Smith-Hill and Bedell

(57) ABSTRACT

A marine vessel includes a rudder support structure attached to its hull and a rudder device attached to the rudder support structure in a manner allowing pivotal movement of the rudder device relative to the rudder support structure. A first drive train includes a first propeller shaft mounted in the hull and extending from the hull. A first propeller unit is attached to the first propeller shaft and is positioned forward of the rudder device. A second drive train includes a second propeller shaft that is mounted rotatably in the rudder support structure and a second propeller unit is attached to the second propeller shaft. The second propeller unit is aft of the first propeller unit and coaxially aligned therewith.

10 Claims, 2 Drawing Sheets

PROPULSION UNIT OF MARINE VESSEL

CROSS REFERENCE TO RELATED APPLICATION

This application claims priority under 35 USC 119 of Finnish Patent Application No. 20030519 filed Apr. 7, 2003.

BACKGROUND OF THE INVENTION

This invention relates to a propulsion unit of a marine vessel.

In this specification the terms "after," "behind," "rear," "in front of" and similar expressions, used in connection with describing a location of an element relative to a marine vessel, are to be understood in the context of the bow of the vessel being considered the front of the vessel and the stern of the vessel being considered the rear of the vessel.

Propulsion of a ship has traditionally been accomplished by using one or several rotating propellers and steering has been accomplished by making use of one or more rudders in connection with a propeller. A contra rotating propeller (CRP) system is known to offer some benefits over a conventional single propeller. For instance, in the case of a CRP system the load is distributed onto the blade area of two propellers instead of one, and the rotational energy of the slip stream of the first propeller may be recovered more efficiently, just to mention two benefits.

The most common solution of providing a CRP system employs two concentric shafts, i.e. a hollow outer shaft and an inner shaft inside the outer shaft. In this kind of solution the first, or front, propeller is connected to the outer shaft and the second, or rear, propeller is connected to the inner shaft, which extends through the hub of the first propeller. U.S. Pat. No. 4,963,108 may be regarded as an example of this kind of a solution. This arrangement requires rather complicated shafting and gear devices. In practice also sealing is prone to be problematic to arrange.

As an alternative, a combination of a traditional shaft driven single propeller and a CRP pod as rear propeller has also been suggested. In this case, the CRP pod is used to steer the vessel and there is no separate rudder. With this solution it is possible avoid the complicated shafting and gear devices of the conventional CRP system having two concentric shafts. However, this solution requires a relatively large gap between the propellers, because the pod must be able to turn behind the front propeller. This in turn decreases the efficiency of the solution.

It is an object of the invention to provide a propulsion unit of a marine vessel, which minimizes the problems of the prior art. It is a specific object of the invention to provide a propulsion unit of a marine vessel, which is additionally capable of steering action.

SUMMARY OF THE INVENTION

In accordance with the invention there is provided a marine vessel comprising a hull, a rudder support structure attached to the hull, a rudder device attached to the rudder support structure in a manner allowing pivotal movement of the rudder device relative to the rudder support structure, a first drive train including a first propeller shaft mounted in the hull and extending from the hull, a first propeller unit attached to the first propeller shaft and positioned forward of the rudder device, a second drive train including a second propeller shaft that is mounted rotatably in the rudder support structure, and a second propeller unit attached to the second propeller shaft, the second propeller unit being aft of the first propeller unit and coaxially aligned therewith.

In a marine vessel embodying the invention, power transmission to the second propeller unit may be provided through a route other than within the shaft that drives the first propeller unit and additionally the propulsion unit is capable of steering action.

The second drive train may include a drive shaft that is supported within the rudder support structure so the synergy of integration of different parts is maximized. The rudder support structure includes a torpedo section, which is arranged behind the first and second propeller units and includes support means for the second propeller unit.

In a marine vessel embodying the present invention, the second drive train may include a propeller shaft that is substantially parallel to the first propeller shaft and also a drive shaft at an angle to the propeller shaft. The propeller shaft and drive shaft of the second drive train are connected with each other by an angle transmission or the like provided within the torpedo section. The drive shaft extends from the torpedo section through the rudder support structure to the interior of the hull.

The first propeller unit includes a first propeller hub and the second propeller unit includes a second propeller hub. The first propeller hub, the second propeller hub and the torpedo section form a substantially streamlined body having increasing cross-sectional area in the aft direction to improve the wake flow and the wake of the flow into the propellers. The first propeller unit and the second propeller unit are arranged to rotate in contrary direction to each other.

According to another advantageous embodiment of the invention a CRP (counter rotating propeller) propulsion unit of a marine vessel is provided, which comprises a front propeller unit assembled to a shaft extending through the hull of the vessel, and a rear propeller unit assembled to a support structure behind the front propeller. In this embodiment at least one of the propeller units is provided with a pitch control arrangement. As the CRP propeller units are supported on the hull by, and the power trains are led through, separate structures, the propeller pitch control may be relatively easily arranged using respective power trains to the propellers. This results in a straightforward manner of providing a propulsion unit with counter rotating, controllable pitch propellers.

The invention provides several benefits over the prior art. Firstly this solution avoids the problems associated with the rear propeller being turned for steering action inside the wake of the forward propeller, which is the case when using a CRP pod as the rear propeller. Secondly, since the rear propeller is integrated with the rudder support structure there is no need for a separate, additional rudder. Additionally the present invention provides a solution that is clearly more feasible than known CRP propellers. It also provides improved hydrodynamic efficiency of the whole assembly owing to the contra rotating propellers and the improved wake originating from the streamlined body of the propeller hubs and the torpedo section.

BRIEF DESCRIPTION OF THE DRAWINGS

The invention will be described with the reference to the accompanying schematic drawings in which.

DETAILED DESCRIPTION

Figure 1:
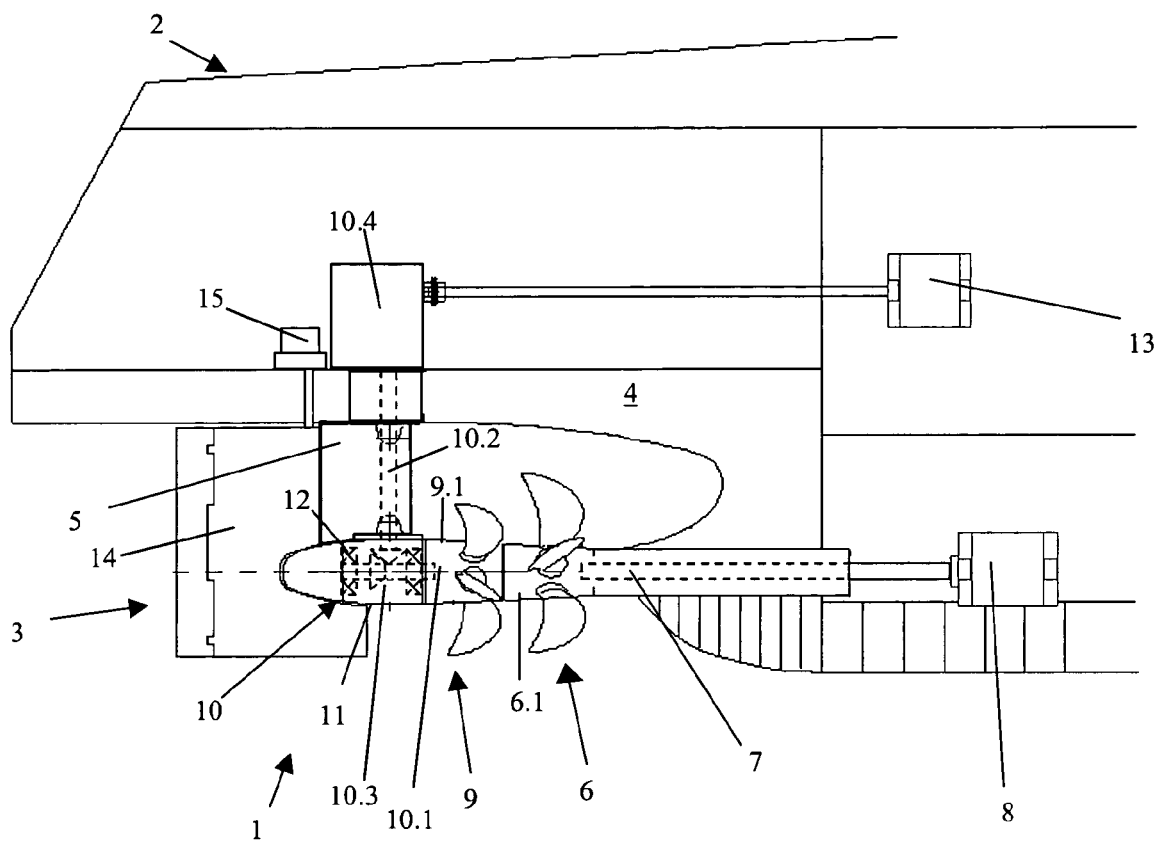
FIG. 1 illustrates one preferred embodiment of the invention.

FIG. 1 shows the stern section of a marine vessel 2. The vessel 2 has a hull 4 and includes a rudder device 3 located behind a first propeller unit 6. The rudder device 3 includes a support structure 5, i.e. a rudder horn, which is rigidly attached to the hull 4 of the vessel 2 and a steering part 14, which is pivoted to the support structure 5. A steering device 15, which may be controlled and operated in a manner known as such, is provided for controlling the steering effect of the rudder device 3.

The first propeller unit 6 is connected in conventional manner by a first shaft arrangement 7 to a power unit 8, which drives the first propeller unit 6. The power unit 8 may be any suitable device for production of power, such as a piston engine, a gas turbine engine or an electric motor. Aft of the first propeller unit 6 there is a second propeller unit 9, which is coupled by a second shaft arrangement 10 to a power unit 13. The first and second propeller units are implemented as so called contra rotating propellers (CRP). This arrangement offers improved propulsion efficiency compared to a conventional single screw arrangement. The propellers are positioned relatively near to each other so that there is only a small gap between the propellers.

The second shaft arrangement 10 comprises a propeller shaft 10.1, which is mounted in suitable support means 12 for the second propeller unit 9 and is parallel to the first shaft arrangement 7. The support means 12 may comprise bearings and/or other power transmission and support devices. In practice it is desirable to arrange the propeller shaft 10.1 and the first shaft arrangement 7 in alignment with each other. The second shaft arrangement 10 also comprises a drive shaft 10.2 which is coupled to the propeller shaft 10.1 by an angle transmission 10.3. The drive shaft 10.2 extends through the support structure 5 of the rudder device 3 and enters the vessel hull 4. There may further be an additional angle transmission/clutch 10.4 through which the drive shaft 10.2 is connected to the power unit 13. It is also possible to connect the shaft 10.2. directly to a power unit. Generally it is possible to use readily available commercial z-drive units for providing power transmission between the second propeller unit 9 and its power unit 13.

In this way the power trains of the two propeller units may be engineered to be separate from each other, thereby avoiding the problems relating to e.g. coaxial shafts in the conventional CRP system.

The support structure 5 defines an interior space and the second shaft arrangement 10 is arranged in connection with the support structure 5 of the rudder device 3, so the shaft and power transmission arrangement 10 for the second propeller unit 9 may extend through the support structure 5 and be supported by the structure 5.

The support structure 5, i.e. the rudder horn of the rudder device 3, is provided with a torpedo section 11 arranged behind the propeller units 6, 9. The torpedo section is streamlined, i.e. any gaps between parts of the torpedo section are small and there are no significant discontinuities in diameter along the length of the torpedo section. The propeller shaft 10.1 and the angle transmission 10.3 are located within the torpedo section 11.

The first propeller unit 6 includes a first propeller hub 6.1. Respectively the second propeller unit 9 includes a second propeller hub 9.1. The first propeller hub 6.1, the second propeller hub 9.1 and the torpedo section 11 form a substantially streamlined body having increasing cross-sectional area in aft direction. This way the efficiency of the whole assembly, contra rotating propeller and integrated rudder device (CRP Rudder), may be maximized.

Figure 2:
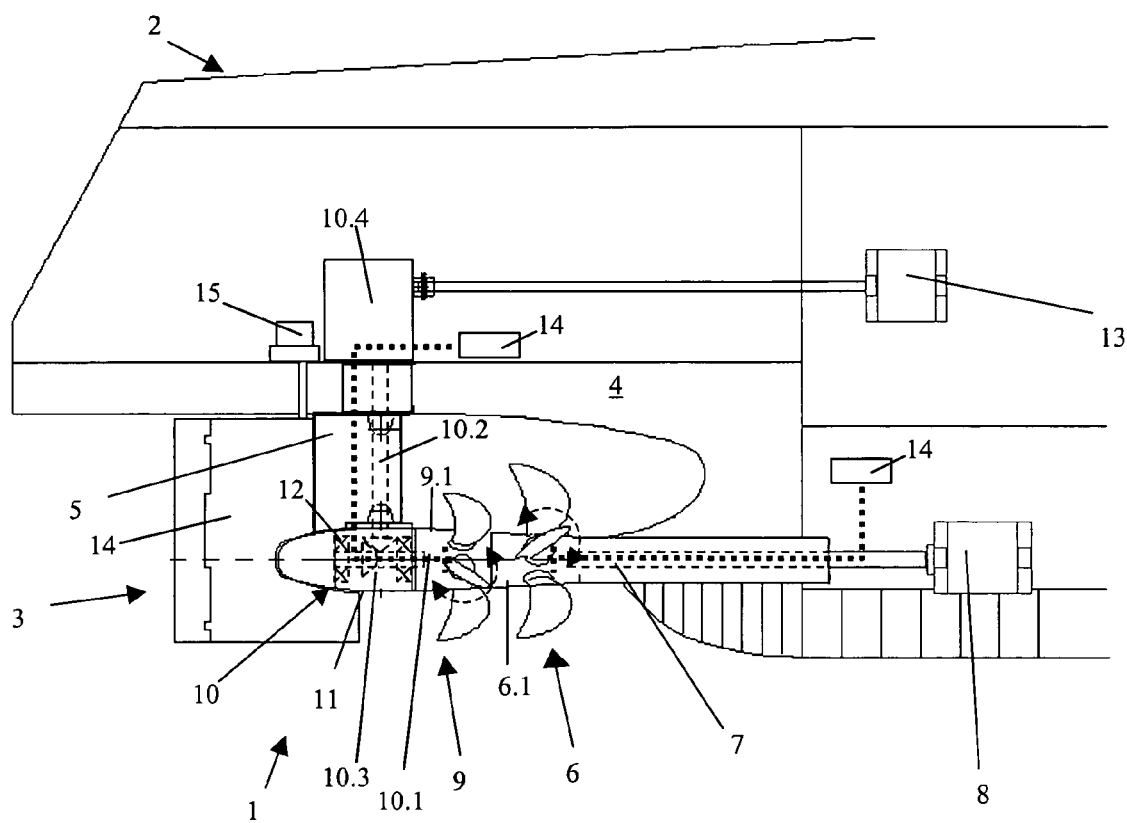
FIG. 2 illustrates another preferred embodiment of the invention.

Now, turning to FIG. 2, in which corresponding reference numbers to those of FIG. 1 are used, another embodiment of the invention will be described. In addition to showing a CRP propulsion unit 1 as shown in FIG. 1, the embodiment is provided with a propeller angle controlling facility 14. Thus FIG. 2 shows a propulsion unit 1 with counter rotating, controllable pitch (CP) propeller units 6, 9. FIG. 2 shows that both of the propeller units 6, 9 are provided with controllable pitch propellers but it is possible, depending on the power source, to use a fixed pitch (FP) propeller in one of the propeller units, for example in the rear propeller unit 9. Using fixed pitch propeller in the rear propeller unit would be beneficial particularly if the power source is an electric motor.

In practice the pitch control is realized e.g. by a hydraulically actuated control system arranged in connection with a drive shaft of the propulsion unit. The assembly comprising counter rotating propellers and having the pitch control facility in at least one of the propeller units provides better propulsion control and allows greater freedom of choice with respect to the power unit for the system.

The invention is not limited to the embodiments shown but several modifications of the invention are reasonable within the scope of the attached claims.

What is claimed is:

1. A marine vessel comprising:
   a hull,
   a rudder support structure attached to the hull,
   a rudder device attached to the rudder support structure in a manner allowing pivotal movement of the rudder device relative to the rudder support structure,
   a first drive train including a first propeller shaft mounted in the hull and extending from the hull,
   a first propeller unit attached to the first propeller shaft and positioned forward of the rudder device,
   a second drive train including a second propeller shaft that is mounted rotatably in the rudder support structure, and
   a second propeller unit attached to the second propeller shaft, said second propeller unit being aft of the first propeller unit and coaxially aligned therewith,
   and wherein the rudder support structure includes a torpedo-shaped section behind the first and second propeller units, the first propeller unit includes a first propeller hub, the second propeller unit includes a second propeller hub, and the first propeller hub, the second propeller hub and the torpedo-shaped section form a substantially streamlined body having a cross-sectional area that substantially continuously increases in the aft direction through said first propeller hub and through said second propeller hub.

2. A marine vessel according to claim 1, wherein the second drive train includes at least one drive shaft that is supported within the rudder support structure.

3. A marine vessel according to claim 1, wherein the second propeller shaft is substantially parallel to the first propeller shaft and the second drive train comprises a drive shaft that is at an angle to the second propeller shaft.

4. A marine vessel according to claim 1, wherein the torpedo-shaped section accommodates support means for the second propeller unit.

5. A marine vessel according to claim 1, wherein the second propeller shaft is substantially parallel to the first propeller shaft and the second drive train comprises a drive shaft that is at an angle to the second propeller shaft.

6. A marine vessel according to claim 5, wherein the second propeller shaft and the drive shaft are connected with each other by an angle transmission mechanism within the torpedo section.

7. A marine vessel according to claim 6, wherein the drive shaft extends from the torpedo section through the rudder support structure and extends into the hull.

8. A marine vessel according to claim 1, wherein the first propeller unit and the second propeller unit are arranged to rotate in contrary directions to each other.

9. A marine vessel according to claim 1, wherein at least one of the propeller units is provided with a pitch control facility.

10. A marine vessel according to claim 1, comprising a first power unit coupled drivingly to the first drive train for rotating the first propeller unit in a first direction, and a second power unit coupled drivingly to the second drive train for rotating the second propeller unit in a second direction, opposite to the first direction.

* * * * *